United States Patent
Andersen et al.

(10) Patent No.: US 6,796,496 B2
(45) Date of Patent: Sep. 28, 2004

(54) SYSTEMS AND METHODS FOR AUTOMATIC LANGUAGE SELECTION FOR SYSTEM USER INTERFACE

(75) Inventors: Eric L. Andersen, Meridian, ID (US); Russell A. Mendenhall, Boise, ID (US); Paul K. Mui, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 09/965,386

(22) Filed: Sep. 27, 2001

(65) Prior Publication Data

US 2003/0057271 A1 Mar. 27, 2003

(51) Int. Cl.[7] ............................................. G06K 5/00
(52) U.S. Cl. ......................................................... 235/380
(58) Field of Search ................................ 235/375, 379, 235/380, 492; 902/25–27; 705/35, 43

(56) References Cited

U.S. PATENT DOCUMENTS

| | | | | |
|---|---|---|---|---|
| 4,484,304 A | * | 11/1984 | Anderson et al. | 345/733 |
| 4,736,405 A | * | 4/1988 | Akiyama | 379/88.11 |
| 5,386,103 A | * | 1/1995 | DeBan et al. | 235/379 |
| 5,436,436 A | * | 7/1995 | Matsukawa | 235/380 |
| 5,705,798 A | * | 1/1998 | Tarbox | 235/379 |
| 5,787,406 A | * | 7/1998 | Arsenault et al. | 705/410 |
| 5,895,903 A | * | 4/1999 | Abe et al. | 235/380 |
| 6,149,057 A | * | 11/2000 | Hollis | 235/379 |

FOREIGN PATENT DOCUMENTS

| | | | | |
|---|---|---|---|---|
| EP | 499211 A2 | * | 8/1992 | G05B/19/04 |
| EP | 0574006 | | 12/1993 | |
| FR | 2793907 | | 11/2000 | |
| GB | 2119992 A | * | 11/1983 | G06F/15/30 |
| JP | 58082365 A | * | 5/1983 | G06F/15/30 |
| JP | 04286582 A | * | 10/1992 | B66B/3/00 |
| JP | 2000132610 A | * | 5/2000 | G06F/17/60 |
| WO | WO 9520859 A1 | * | 8/1995 | H04M/3/50 |

OTHER PUBLICATIONS

Eiichi, Youshikawa (Apr. 10, 1992), JP04109360: Transaction Device Having Card Processor, Patent Abstracts of Japan.
Akio, Suzuki (Jul. 02, 1999), JP11177739: Image Processor, Patent Abstracts of Japan.
Akifumi, Hasebe (Apr. 14, 1988), JP63083883: Processing system for Portable Medium, Patent Abstracts of Japan.

* cited by examiner

Primary Examiner—Diane I. Lee

(57) ABSTRACT

A portable memory medium with memory means, e.g., a magnetic strip or integrated circuit, for storing personal data and a language identifier that identifies a preferred language of an owner of the portable memory medium. For example, an automated teller machine (ATM) card includes a language identifier that indicates a preferred language in which the ATM card owner desires to have an ATM machine present a user interface in the preferred language. When the ATM card is inserted into the ATM machine, the ATM machine reads the language identifier from the ATM card, identifies a preferred language associated with the language identifier, and presents a user interface in the preferred language. A secondary language identifier may also be used in the event that the original language identifier is not recognized.

21 Claims, 5 Drawing Sheets

| Primary Language Identifier 302 | Secondary Language Identifier 304 | Personal Data 306 |
|---|---|---|

Memory Record
300

*Fig. 3*

| Language Identifier 402 | PIN 404 | Personal Data 406 | Bank Data 408 | Account Data 410 |
|---|---|---|---|---|

Memory Record
400

*Fig. 4*

SYSTEMS AND METHODS FOR AUTOMATIC LANGUAGE SELECTION FOR SYSTEM USER INTERFACE

TECHNICAL FIELD

This invention generally relates to devices for identifying persons by way of a portable memory medium, such as a card with memory. More particularly, the invention relates to portable memory media that provide automatic language selection for use with an interface in devices that identify persons by way of the portable memory media.

BACKGROUND

Since the inception of public automated teller machines (ATMs), the number of ATMs in existence has increased dramatically. ATMs can be found not only on bank premises, but in airports, grocery stores, convenience stores, drive-through kiosks, etc. In addition, ATM users have experienced an additional convenience provided by many ATM machines that allows ATM users to use ATMs abroad, in countries other than which the ATM user's account is based. For example, a person who has an ATM card for accessing accounts at a banking institution in the United States may be able to withdraw cash from an ATM machine in an airport in Tokyo.

However, this convenience does not come without a tradeoff. An American who wishes to use the ATM machine in Tokyo may only speak English, which will probably make it impossible for the American to use the machine. Even if the machine provides a choice of languages, e.g., Japanese or English, a question allowing the user to choose the desired language will most likely be presented in the language of the country in which the ATM machine is located. In this example, the question of whether the user would like Japanese or English will probably be presented in Japanese. Unless the English-speaking user can recognize enough Japanese to understand the question and the appropriate answer to the question, the user may be unable to use the machine.

SUMMARY

Systems and methods are described herein for automatically selecting a language desired by a user of a machine that utilizes an interactive interface, such as an automated teller machine, by pre-programming a portable memory medium.

When a portable memory medium is issued to a user, certain personal data is stored on the portable memory medium. The portable memory medium may be in the form of a card having some type of memory, such as a magnetic strip, an integrated circuit (IC) or the like.

When a user initially provides the personal data that is stored on such a portable memory medium, the user also provides a preferred language identifier. The preferred language identifier is read by the system providing the interactive interface and the interface is provided to the user in the language of the user's choosing. For example, if a user specifies that all such transactions are preferred to be in English, the preferred language identifier associated with English is stored on the portable memory medium. When the portable memory medium is inserted into the system providing the interface, the system reads the preferred language identifier and provides the user interface in the language associated with the preferred language identifier—in this case, English.

If the preferred language is unavailable in a particular system, the system reverts to a default language. Alternatively, the portable memory medium may also store a secondary preferred language identifier that identifies a secondary language to be used in the event that the preferred language identifier is unavailable.

BRIEF DESCRIPTION OF THE DRAWINGS

The present invention is illustrated by way of example and not limitation in the figures of the accompanying drawings. The same numbers are used throughout the figures to reference like components and/or features.

FIG. 3 is a depiction of an exemplary memory record from a portable memory medium.

FIG. 4 is a depiction of an exemplary memory record from a portable memory medium.

DETAILED DESCRIPTION

The following description sets forth one or more specific implementations and/or embodiments of systems and methods for automatic language selection for use with a user interface. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods for use with automatic language selection technology. Applicant intends these exemplary implementations to be examples only. Applicant does not intend these exemplary implementations to limit the scope of the claimed present invention. Rather, Applicant has contemplated that the claimed present invention might also be embodied and implemented in other ways, in conjunction with other present or future technologies.

Computer-Executable Instructions

An implementation of a system and/or method for automatically selecting a language in which a user interface is presented may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a system and/or method for automatic language selection for a user interface may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Portable Memory Media

Figure 1:
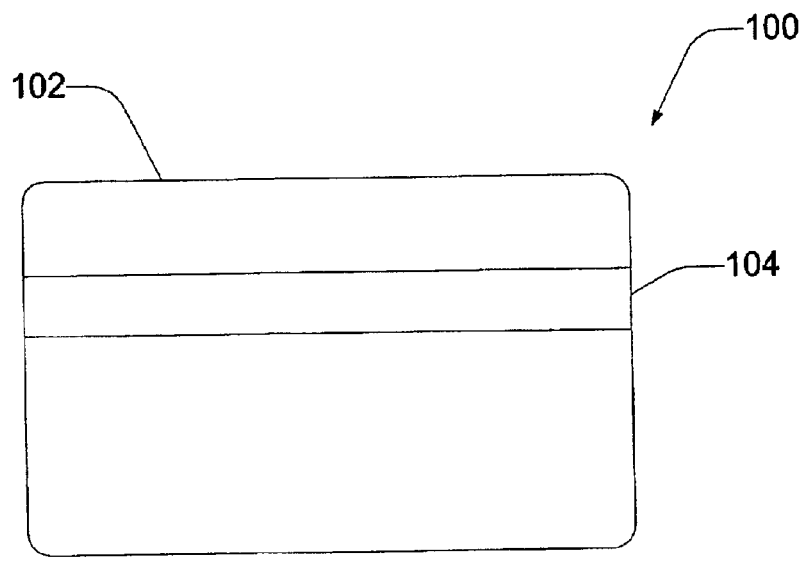
FIG. 1 is an illustration of a card having a magnetic strip memory.

FIG. 1 is an illustration of a portable memory medium 100 embodied as a card 102 similar to an automated teller machine (ATM) card. The card 102 includes a magnetic strip 104 that stores information pertinent to an owner of the card 102.

Figure 2:
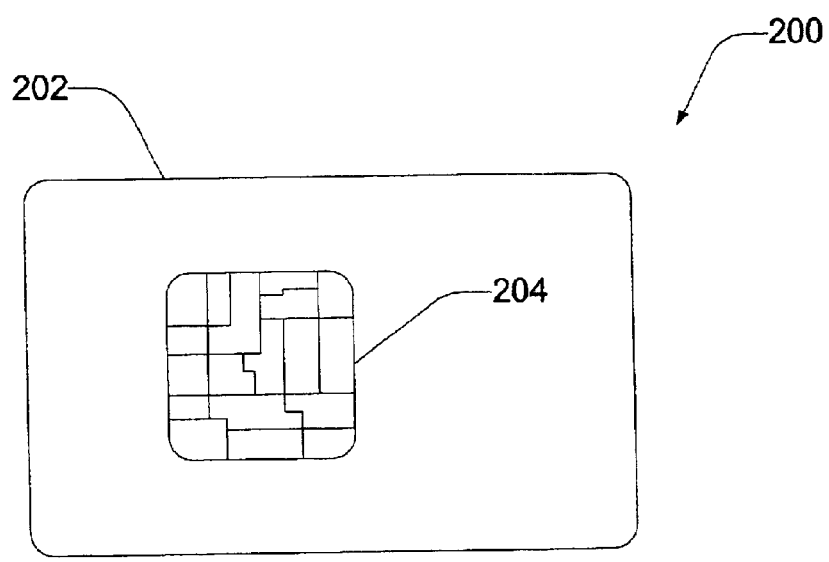
FIG. 2 is an illustration of a card having an integrated circuit thereon.

FIG. 2 is an illustration of an alternative embodiment of a portable memory medium 200. Portable memory medium 200 includes a card 202 on which an integrated circuit 204 is mounted. Integrated circuit cards are well known in the art. The integrated circuit 204 is used to store information pertinent to an owner of the card 202.

Exemplary Memory Record

FIG. 3 is a depiction of an exemplary memory record 300 from a portable memory medium (100, FIG. 1; 200, FIG. 2). The memory record 300 includes a primary language identifier 302 that is used to identify a primary interface language that is preferred by an owner of the portable memory medium 100, 200. A computing device that recognizes the primary language identifier 302 will display user interface text in the primary interface language designated for use with the portable memory medium owner.

Although not required, the memory record 300 also includes a secondary language identifier 304 that is used to identify a secondary interface language that is preferred by the owner of the portable memory medium 100, 200 in the event that the user interface is not available for display in the primary preferred language. A computing device that recognized the secondary language identifier 304 will display the user interface in the secondary interface language designated by the owner.

It is noted that the secondary language identifier 304 is optional and that the present invention may be implemented using only the primary language identifier 302.

The memory record 300 also stored personal data 306 that is related to the owner of the portable memory medium 100, 200. For example, the personal data 306 might includes the owner's name, address, telephone number, etc. Other personal and/or private information may also be stored in the personal data 306.

FIG. 4 is a depiction of an alternative exemplary memory record 400 from a portable memory medium, such as the portable memory medium 100 shown in FIG. 1, or the portable memory medium 200 as shown in FIG. 2. The memory record 400 depicts values that are typically stored in an automated teller machine (ATM) card. For purposes of this discussion, it is assumed that memory record 400 is stored on an ATM card.

The memory record 400 includes a language identifier 402, a personal identification number (PIN) 404, personal data 406, bank data 408 and account data 410. The language identifier 402 indicates an interface language that is preferred by the ATM card owner. When the language identifier 402 is read by an ATM machine (as will be discussed in greater detail below) the user interface text is displayed in the interface language associated with the language identifier 402. It is noted that, although a secondary language identifier may be utilized with the memory record 400, only a (primary) language identifier 402 is required, as shown.

The PIN 404 is a personal number known only by the ATM card owner. The PIN 404 is usually required to be entered before transactions may be initiated with an ATM card. Personal identification numbers are well known in the art and further details of PINs are not necessary for discussion of the present invention.

The personal data 406 includes personal information related to the ATM card owner. For example, the personal data 406 may include a name, address, telephone number, etc. for one or more owners of the ATM card. The bank data 408 includes information related to a bank that has issued the ATM card. The bank name, address, routing number, etc., may be stored in the bank data 408. The account data 410 includes information related to one or more bank accounts owned by the ATM card owner and associated with the ATM card. For example, the owner's checking account number, savings account number, account balances, etc., may be stored in the account data 410.

For the purposes of the present invention, it is noted that only the language identifier 302, 402 be stored on a portable memory medium with some other information. The language identifier 302, 402 may include a text representation of the name of a preferred language to use in displaying a user interface, or it may be a code that is reconciled by a computing device that reads the portable memory medium to determine the preferred language for use in displaying the user interface. Any representation that may be used to automatically identify and display an appropriate interface language may be used.

Exemplary Computing Device Using Auto Language Selection

Figure 5:
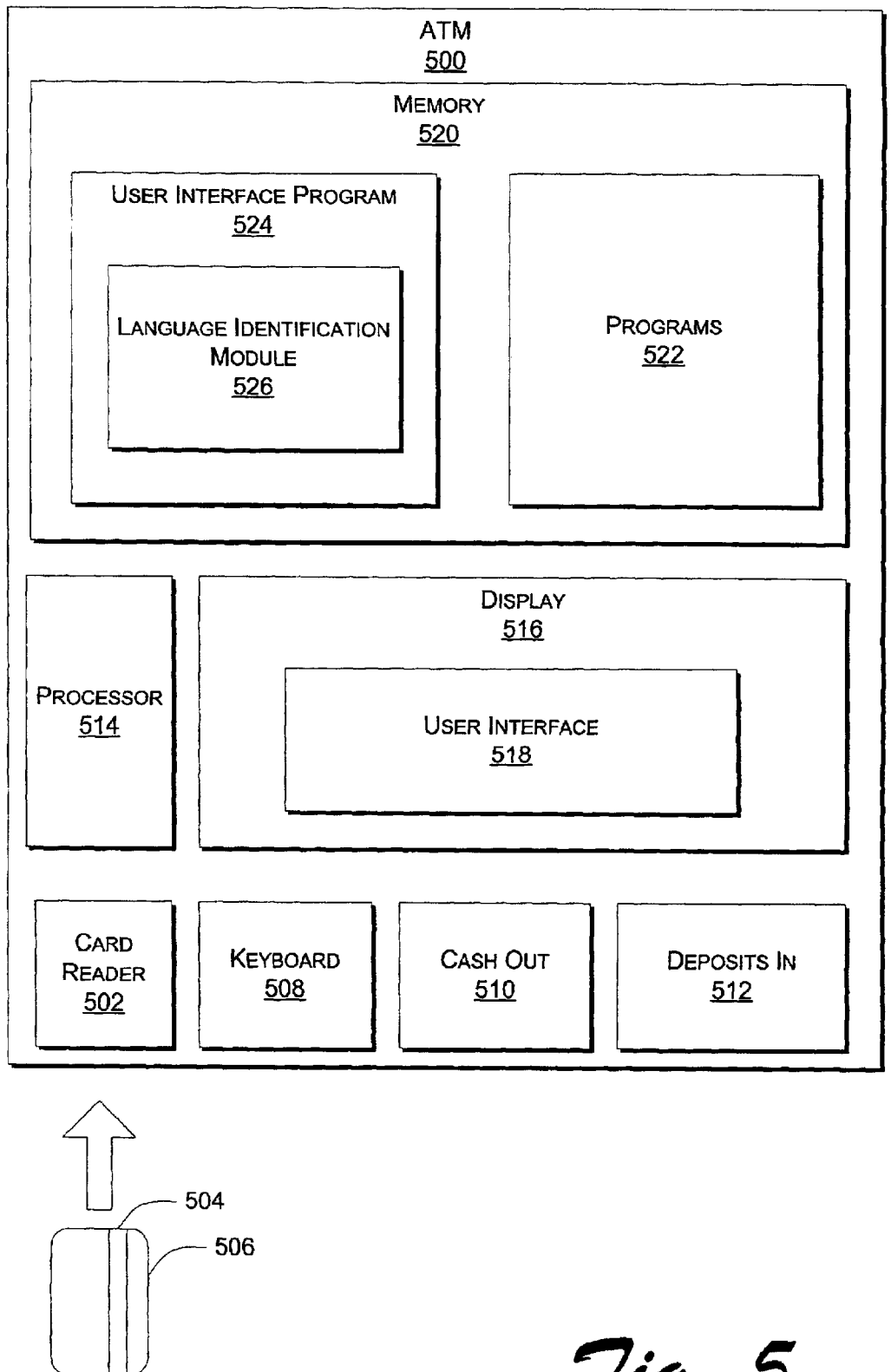
FIG. 5 is a block diagram of an interactive system for use with a portable memory medium.

FIG. 5 is a block diagram of computing device that utilizes automatic language selection to determine an appropriate language in which to display a user interface. An automated teller machine (ATM) 500 includes a card reader 502 that is configured to read data from a magnetic memory strip 504 of an ATM card 506. The ATM 500 may accept the ATM card 506 internally, or it may be configured to read memory such as integrated circuit (IC) memory or radio frequency identification (RFID) memory without having to physically accept the ATM card 506. For example, the ATM 500 may read RFID memory integrated with a card when the card is positioned close to the card reader 502, which in the case of RFID memory, consist of an RFID interrogator (not shown). For purposes of the present discussion, it is assumed that the ATM 500 is configured to accept the ATM card 506 into the ATM 500, where the card reader 502 reads the memory strip 504 of the ATM card 506.

The ATM 500 also includes a keyboard 508 for accepting user input, a cash out module 510 that dispenses cash to a user, and a deposits in module 512 that is configured to accept deposit slips, cash, etc. from a user. The ATM 500 further includes a processor 514 and a display 516 that displays a user interface 518. The user interface 518 provides instructions that a user follows to enter data at appropriate times during an ATM 500 transaction.

The ATM 500 contains memory 520 that stores programs 522 used in typical ATM 500 transactions. The memory 520 also stores a user interface program 524 that generates a user interface that is displayed to assist a user with ATM transactions. The user interface program 524 includes a language identification module 526 that is utilized by the user interface program 524 to identify an interface language so that the user interface 518 may be displayed in a language preferred by the user. The methodology of this task will be described in greater detail below.

The present example is described in relation to automated teller machines currently in use. Therefore, the logic performed by the ATM is similar to logic performed on a typical ATM. However, the present invention may be implemented using a dumb terminal as an ATM, in which case, the logic described for the ATM may actually be performed by the circuitry of an integrated circuit card. In such a case, the integrated circuit will contain the necessary programming to perform the language identification steps described below.

Methodological Implementation of a Printer Group Definition

Figure 6:
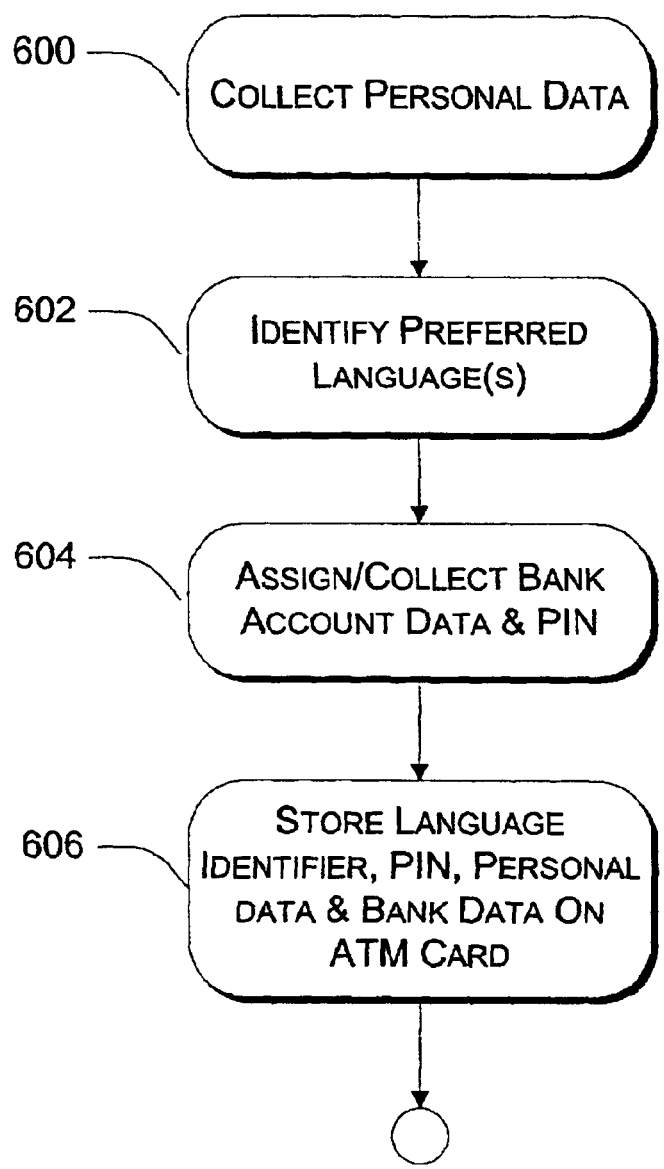
FIG. 6 is a flow diagram depicting a method for configuring a portable memory medium for use with an automatic language selection system.

FIG. 6 is a flow diagram depicting a methodological implementation of configuring a portable memory medium for use with an automatic language selection system. For purposes of the following discussion, it is assumed that the portable memory medium is an automated teller machine (ATM) card.

At block 600, personal data is collected from an owner of the ATM card. This is typically done when an owner requests the ATM card from the owner's financial institution. Usually, the owner fills out paper forms with personal information and turns the forms in to the financial institution. However, any method by which personal data may be collected may be utilized.

At block 602, one or more preferred languages for the ATM card owner are identified. This may be done simply as a question on the personal information forms or it may be entered into a system any time after the owner's personal data is in the system. If more than one language is identified, then a primary preferred language and a secondary preferred language are indicated. If no indication is made for a preferred language or if a computing device is not configured to recognize the language identifier, then a default display language may be used by the computing device to display a user interface.

After the personal data and preferred language are collected, other pertinent data is assigned and/or collected at block 604. In the case of an ATM card, a personal identification number (PIN) is selected by the card owner or assigned by the issuing bank. Furthermore, bank data and bank account data associated with the bank and user, respectively, are collected and associated with the ATM card owner and/or the ATM card.

At block 606, the one or more language identifiers, PIN, personal data, bank data and account data are stored on the ATM card. The arrangement of this data is dependent on the type of portable memory medium that is used, as well as the computing device that will read the data. For example, if only a primary language identifier is used, then a computing device reading the data will only look for one language identifier.

As an example, and not by way of limitation, if the language identifier comprises a four digit binary number at the beginning of the data on the portable memory medium, then the computing device will recognize the first four binary digits as the language identifier. If, on the other hand, the language identifier is a textual representation of the name of the language (e.g., "English"), then the computing device will be programmed to look for such textual representations in a certain field of the data stored in the portable memory medium.

The exact implementation of storing the data may be determined on a case-by-case basis and is not specified herein. The present invention involves the inclusion of the language identifier with the data stored on the portable memory medium.

Methodological Implementation of a Printer Group Data Collection

Figure 7:
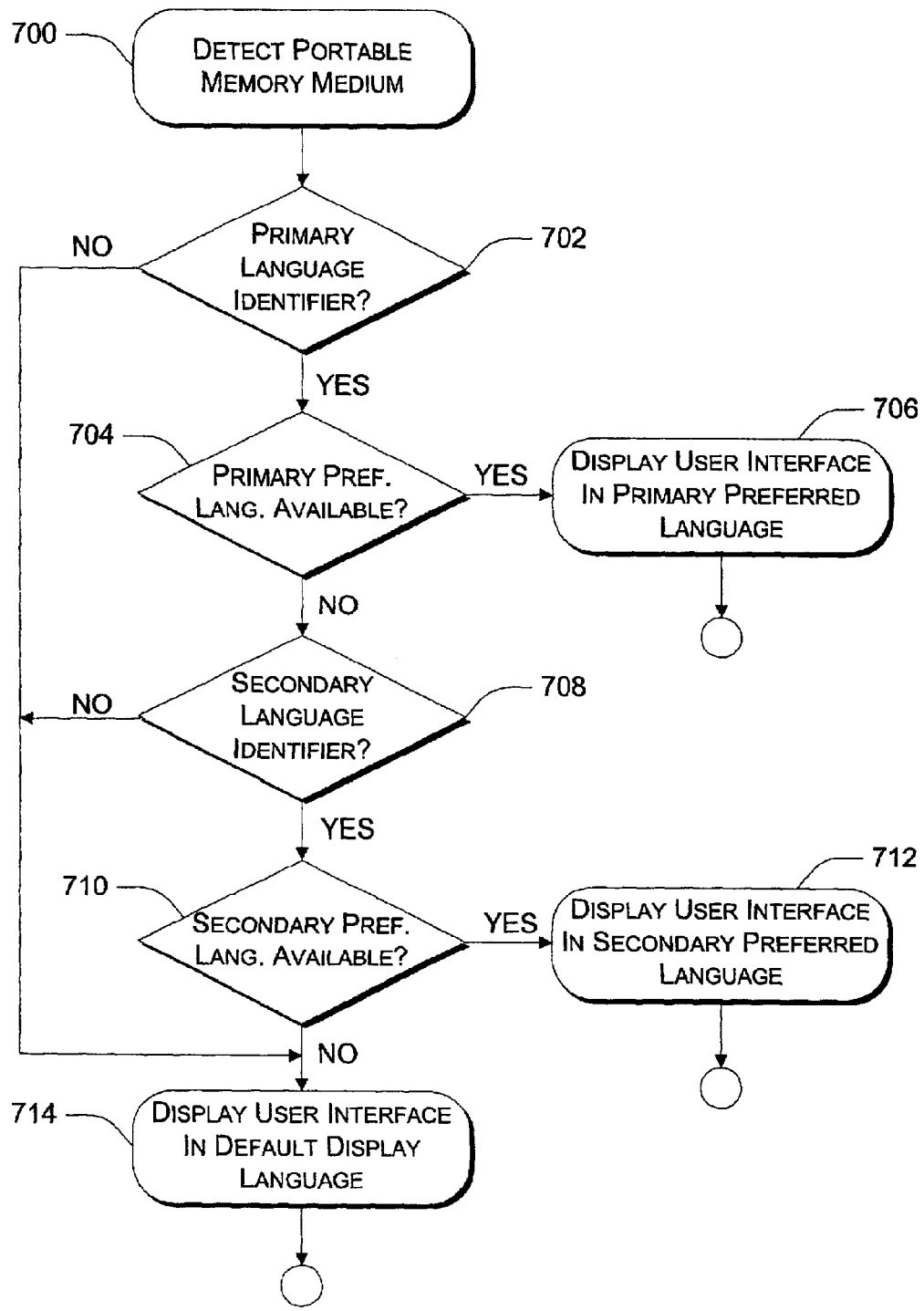
FIG. 7 is a flow diagram depicting a method for use in a computing system that provides automatic language selection for a user interface.

FIG. 7 is a flow diagram that depicts a method for use in a computing device that provides automatic language selection for a user interface based on information contained in a portable memory medium. For discussion purposes, the computing device is assumed to be the automated teller machine (ATM) 500 shown in FIG. 5. For this reason, continuing reference will be made to the features and reference numerals shown in FIG. 5. The portable memory medium is assumed to be an ATM card similar to those shown in FIG. 1 and FIG. 2. However, it is noted that use of these examples is not meant to limit application of the invention in any way.

At block 700, the ATM 500 detects when the ATM card 506 is inserted into the ATM 500. The ATM 500 is configured to read the ATM card 506 and determine if the ATM card 506 stores a primary language identifier (302, FIG. 3) (block 702). If no primary language identifier 302 is found on the ATM card ("No" branch, block 702), then the user interface program 524 displays the user interface 518 using a default display language at block 714. If the ATM 500 determines that the primary language identifier 302 is stored on the ATM card 506 ("Yes" branch, block 702), then the language identification module 526 determines if the user interface 518 is available in the primary preferred language that is identified by the primary language identifier 302 (block 704).

If the user interface 518 is available in the primary preferred language ("Yes" branch, block 704), then the user interface program 524 displays the user interface 518 in the primary preferred language at block 706. If, however, the user interface 518 is not available in the primary preferred language ("No" branch, block 704), then the ATM 500 determines if the ATM card 506 stores a secondary language identifier (FIG. 3, 304) at block 708.

If a secondary language identifier 304 is not stored on the ATM card 506 ("No" branch, block 708), then the user interface program 524 displays the user interface 518 in the default display language at block 714. If the secondary language identifier 304 is present on the ATM card 506 ("Yes" branch, block 708), then the language identification module 526 determines if the language indicated by the secondary language identifier is available in a secondary preferred language that is identified by the secondary language identifier 304. If the user interface 518 is available in the secondary preferred language ("Yes" branch, block 710), then the user interface program 526 displays the user interface 518 in the secondary preferred language at block 712. If the user interface 518 is not available for display in the secondary preferred language ("No" branch, block 710), then the user interface program 526 displays the user interface 518 in the default display language at block 714.

It is noted that the steps associated with block 708, 710 and 712 are optional and are only used if a secondary language identifier is used. On the other hand, more than two language identifiers could be used and—in such a case—additional steps (similar to blocks 708–712) would be required.

CONCLUSION

Implementation of the automatic language selection systems and methods described herein provide efficient ways for displaying a user interface to a user in a language preferred by the user. With such systems and methods, a user is assured the convenience and availability of systems located in countries other than the user's home country.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for automatically selecting a language in which to display a user interface, comprising:
    reading a primary language identifier from a portable memory medium;
    reading a secondary language identifier from the portable memory medium;
    identifying a primary preferred language associated with the primary language identifier, the primary language being a language preferred by a portable memory medium user;
    in the event that the primary preferred language is unavailable, identifying a secondary preferred language associated with the secondary language identifier, the secondary preferred language being a language preferred by the user if the primary preferred language is unavailable; and
    displaying the user interface in the secondary preferred language.

2. The method as recited in claim 1, wherein the portable memory medium further comprises a card having a magnetic strip.

3. The method as recited in claim 1, wherein the portable memory medium further comprises an integrated circuit card.

4. The method as recited in claim 1, wherein the portable memory medium further comprises an automated teller machine (ATM) card.

5. A computing device comprising memory that stores computer-executable instructions that, when executed by a processor of the computing device, performs the method recited in claim 1.

6. A portable memory medium configured to be inserted into an interface of a computing device for effecting identification of an owner of the medium, said computing device including a display that displays a computing device user interface, the portable memory medium comprising memory means for storing personal data and a language identifier that identifies a primary preferred language of the owner and a secondary preferred language of the owner, wherein said display presents the user interface in the secondary preferred language after reading the language identifiers from the portable memory medium and determining that the primary preferred language is unavailable.

7. The portable memory medium as recited in claim 6, wherein the memory means further comprises a magnetic strip.

8. The portable memory medium as recited in claim 6, wherein the memory means further comprises an integrated circuit.

9. The portable memory medium as recited in claim 6, wherein the computing device further comprises an automated teller machine (ATM) and the portable memory medium further comprises an ATM card.

10. A method for configuring a portable memory medium for use by an owner of the portable memory medium, comprising:
    storing personal data associated with the owner in memory means of the portable memory medium;
    storing a primary language identifier in the memory means of the portable memory medium, the primary language identifier indicating a primary preferred language of the owner;
    storing a secondary language identifier in the memory means of the portable memory medium, the second language identifier indicating a secondary preferred language of the owner; and
    wherein a computing device designed to operate with the portable memory medium displays a user interface in the secondary preferred language of the owner of the portable memory medium after the computing device reads the language identifiers from the portable memory medium and determines that the primary preferred language is unavailable.

11. The method as recited in claim 10, wherein the computing device further comprises an automated teller machine (ATM) and the portable memory medium further comprises an ATM card.

12. The method as recited in claim 10, wherein the memory means further comprises a magnetic strip.

13. The method as recited in claim 10, wherein the memory means further comprises an integrated circuit.

14. An automated teller machine (ATM) card, comprising memory means for storing:
    personal data related to an ATM card owner;
    a primary language identifier that identifies a primary preferred language of the ATM card owner;
    a secondary language identifier that identifies a secondary preferred language of the ATM card owner; and
    wherein, upon insertion of the ATM card into an ATM machine, the ATM machine reads both language identifiers from the ATM card and displays a user interface to the ATM card owner in the secondary preferred language identified by the secondary language identifier in the event that the primary preferred language is unavailable.

15. The ATM card as recited in claim 14, wherein the memory means further comprises a magnetic strip.

16. The ATM card as recited in claim 14, wherein the memory means further comprises an integrated circuit.

17. One or more computer-readable media containing computer-executable instructions that, when executed on a computer, perform the following steps:
    reading a first language identifier and a second language identifier from a portable memory medium;
    identifying a first preferred language associated with the language identifier;
    identifying a second preferred language associated with the second language identifier; and
    displaying a user interface in the second preferred language in the event that a user interface in the first preferred language is unavailable.

18. The one or more computer-readable media as recited in claim 17, wherein the portable memory medium is an automated teller machine (ATM) card having a magnetic strip.

19. The one or more computer-readable media as recited in claim 17, wherein the portable memory medium is an integrated circuit (IC) card.

20. The one or more computer-readable media as recited in claim 17, further comprising computer-executable instructions that, when executed on a computer, perform the following additional step:

displaying the user interface in a default language in the event that the user interface cannot be displayed in the second preferred language.

21. An automated teller machine (ATM), comprising:

memory;

a processor;

a display;

a user interface produced by a user interface program stored in the memory and executable by the processor, the user interface being displayable on the display in more than one language;

a card reader configured to read data stored on memory means on an ATM card, the data including a primary language identifier that identifies a primary preferred language of an owner of the ATM card and a secondary language identifier that identifies a secondary preferred language of the owner of the ATM card; and a language identification module stored in the memory and executable on the processor, the language identification module configured to select an appropriate language in which the user interface is displayed, said selection being based on the availability of the primary preferred language identified by the primary language identifier and the secondary preferred language identified by the secondary language identifier.

\* \* \* \* \*